United States Patent
Raghavan et al.

(10) Patent No.: US 6,805,895 B1
(45) Date of Patent: Oct. 19, 2004

(54) SUGARCANE JUICE SPREAD AND A PROCESS FOR PREPARING THE SAME

(75) Inventors: Bashyam Raghavan, Mysore (IN); Kulathooran Ramalakshmi, Mysore (IN); Babasaheb Bhaskarrao Borse, Mysore (IN); Mysore Nagarajarao Ramesh, Mysore (IN); Vishweshwaraiah Prakash, Mysore (IN); Guruguntla Sulochanamma, Mysore (IN)

(73) Assignee: Council of Scientific and Industrial Research, New Delhi (IN)

( * ) Notice: Subject to any disclaimer, the term of this patent is extended or adjusted under 35 U.S.C. 154(b) by 260 days.

(21) Appl. No.: 10/106,404

(22) Filed: Mar. 25, 2002

(51) Int. Cl.$^7$ ................................................. A23L 1/06
(52) U.S. Cl. ....................... 426/575; 426/578; 426/658; 127/43; 127/55
(58) Field of Search ................................. 426/575, 578, 426/658; 127/43, 53

(56) References Cited

U.S. PATENT DOCUMENTS 4,523,959 A * 6/1985 Exertier ...................... 127/46.2
4,627,880 A * 12/1986 Langen et al. ................ 127/43
5,270,071 A    12/1993 Sharp et al.
2003/0185959 A1 * 10/2003 Singh et al. ................. 426/590

FOREIGN PATENT DOCUMENTS

DE          19854800 A1    6/2000
WO        WO 03/079822    * 10/2003

* cited by examiner

Primary Examiner—N. Bhat
(74) Attorney, Agent, or Firm—McDonnell Boehnen Hulbert & Berghoff

(57) ABSTRACT

The present invention relates to a sugarcane juice spread and more particularly, the present invention relates to a sugarcane juice spread which incorporates ginger and cumin flavors and a process for preparing the same.

13 Claims, 1 Drawing Sheet

SUGARCANE JUICE SPREAD AND A PROCESS FOR PREPARING THE SAME

FIELD OF THE INVENTION

The present invention relates to a sugarcane juice spread. More particularly, the present invention relates to a sugarcane juice spread which incorporates ginger and cumin flavors. The present invention also relates to a process for preparing the same.

BACKGROUND AND PRIOR ART TO THE INVENTION

The sugarcane contains 18–20% soluble solids and is reported to impart health benefits to the consumers. The juice, obtained on crushing the canes, with its delicate aroma is a popular beverage with the consumers.

India has been known as the original home of sugarcane and the second largest producer next to Brazil. Presently, India produces about 280 million tonnes of sugarcane in an area of 4 million hectares. Of this, about 46% goes for the manufacture of white crystal sugar and around 42% for gur/khandsari production. The remaining quantity is available for the manufacture of sugarcane juice. It is a common practice in India to dispense the juice fresh either as such or with the addition of limejuice and/or fresh ginger extract in glasses by the vendors to the consumers. The major problem encountered in this operation is the lack of hygiene resulting in contamination of the juice with the heavy load of microorganisms which arises due to improper cleaning of the sugarcanes and handling of the finished product. Raw sugarcane juice is a carbohydrate rich, low acid food and is therefore susceptible to the growth of yeasts, of spoilage bacteria and also of pathogenic bacteria. Such freshly crushed juice cannot be preserved even for a few hours since it is known to ferment very quickly.

There is no knowledge/information regarding its preparation as a jam or 'spread' type product. There are a number of patents relating to the preparation of fruit jams/spreads but none of them relate to sugarcane juice spread.

Reference may be made to a process for the preparation of pumpkin fruit spread (Kraener Lothar, DE 19854800, June 2000) in which a fruit based spread was prepared from pumpkin fruit flesh and pumpkin seed components. However, the present invention is different from the above patent with respect to the starting material.

Reference may also be made to the preparation of reduced calorie fruit spread (Sharp SE and Antenucci R N, U.S. Pat. No. 5,270,071, December 1993) wherein a reduced calorie fruit spread was prepared by mixing fruit or fruit flavouring with sucralose, methoxy pectin or carrageenan, carboxy methyl cellulose, guar gum and locus bean gum. This patent is entirely different from the present invention since the former involves use of an intense sweetener and the product is dietetic in nature.

One more reference may be made to a method on the preparation of banana spread in which banana puree was incorporated with sodium metabisulphite, and other ingredients. The mixture was cooked to a thick consistency, poured into sterilized bottles and processed for 30 minutes [Adeva L V, Gopez, M D and Payumo, E M, 1968, Studies on the preparation of banana spread, Philippine J. Nutri, 21(4); 234–40]. The major drawback of this method is the long processing time (30 min) after the preparation of spread. This will reduce the banana flavour of the prepared spread.

OBJECTS OF THE INVENTION

The main object of the present invention is to provide sugarcane juice spread.

Another object of the present invention is to provide a ginger and cumin flavored sugarcane juice spread.

Yet another object of the present invention is to provide a process for preparing a ginger and cumin flavored sugarcane juice spread.

DETAILED DESCRIPTION OF THE INVENTION

Accordingly, the present invention provides a sugarcane juice spread comprising 85 to 95% by wt. concentrated sugarcane juice having a concentration of 45 to 60° Brix, 0.05 to 0.5% by wt Xanthan, 0.05 to 1.0% by wt Carrageenan, 1.0 to 3.0% by wt food preservative, 1.0 to 5.0% by wt. of a gelling agent, 5.0 to 30.0 ppm of a nutraceutical and optionally 0.1 to 1,5% by wt of a flavoring agent.

More particularly, the present invention provides a ginger and cumin flavored sugarcane juice spread comprising 85 to 90% by wt. concentrated sugarcane juice having a concentration of 45 to 60° Brix, 0.05 to 0.5% by wt Xanthan, 0.05 to 1.0% by wt Carrageenan, 1.0 to 3.0% by wt food preservative, 1.0 to 5.0% by wt. of a gelling agent, 5.0 to 30.0 ppm of a nutraceutical and 0.1 to 0.5% by wt. of Ginger extract and 0.1 to 0.6% by wt Cumin extract.

In an embodiment of the present invention, the food preservative is citric acid.

In another embodiment of the present invention, the gelling agent is pectin.

In yet another embodiment of the present invention, the nutraceutical is β-carotene.

The present invention also provides a process for preparing a ginger and cumin flavored sugarcane juice spread, said process comprises:

a. soaking the canes in water containing 0.1% by wt. potassium meta bi-sulphite and 0.01% by wt. citric acid for 2–4 hrs;
b. washing the sugarcanes of step (a) and crushing the same to obtain sugarcane juice having a concentration of 18–20° Brix;
c. filtering the sugarcane juice of step (b) at 25–28° C.;
d. concentrating the filtered juice of step (c) to a solid content of 45–60° Brix;
e. adding 0.1–1.0% by wt of food preservatives to the concentrated juice of step (d);
f. thickening or emulsifying the concentrated juice of step (e) by adding 0.5 to 5% by wt. pectin and 0.03 to 0.5%, by wt. of a heteropolysaccharide;
g. adding 0.03–1.0% by wt. carrageenan to the emulsified sugarcane juice of step (f);
h. heating the mixture of step (g) for 6–15 min to 90–98° C. to achieve setting;
i. adding 1–100 ppm of β-carotene to the mixture of step (h);
j. optionally adding ginger/cumin oleoresin at a concentration range of 0.1–0.6% by wt. followed by stirring, and
k. cooling the mixture of step (j) at ambient temperature to obtain the sugarcane juice spread.

In an embodiment of the present invention wherein in step (b), the sugarcanes are washed with plain water before being crushed.

In another embodiment of the present invention wherein in step (b), the sugarcanes are crushed using mechanical devices.

In yet another embodiment of the present invention wherein in step (c), the sugarcane juice is filtered by centrifuging at 2000–2500 rpm.

In still another embodiment of the present invention wherein in step (d) the sugarcane juice is concentrated using thin film evaporator.

In a further embodiment of the present invention, the food preservative is citric acid.

In one more embodiment of the present invention, wherein in step (f) 0.03 to 0.07% by wt. of heteropolysaccharide is used.

In one another embodiment of the present invention, a natural food flavor such as ginger/cumin oleoresin may be used at a specific concentration range of 0.1–0.4% by wt.

BRIEF DESCRIPTION OF THE DRAWINGS

The process for the preparation of sugarcane juice spread is illustrated in the flow chart in FIG. 1.

The novelty of the process lies in the combined manner in which critical steps such as pre-treatment of the sugarcanes, use of sugarcane juice (no added sugar), concentration of the juice under vacuum to preserve nutrients and delicate aroma and processing with acidulant, emulsifying and/or thickening agents and spice flavors to obtain the flavored sugarcane juice spread.

Figure 1:
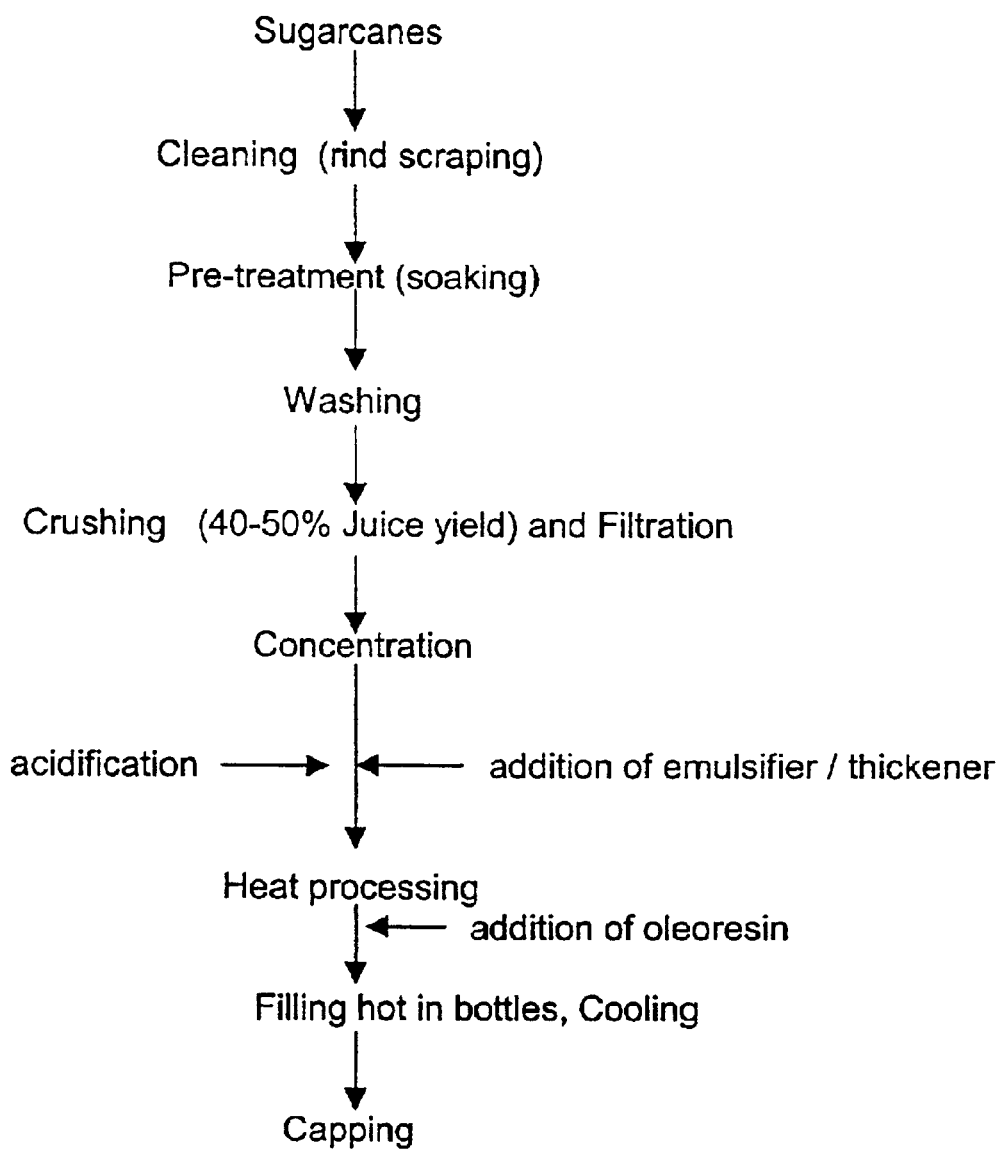

The following examples are given by way of illustration of the present invention and therefore should not be construed to limit the scope of the present invention.

EXAMPLE 1

60 Kg Sugarcanes were cleaned with water and the outer skin scraped manually with a knife. The scraped sugarcanes were soaked in 0.1% KMS solution mixed with 0.01% citric acid in 200 L water for 4 hours. The canes were removed, drained off water, washed with fresh water and then crushed using a motorised crusher to obtain the juice. The spent canes were repeatedly passed through the crusher three more times and the total juice collected (25.5 L). The juice was subjected to centrifugation using a Westphalia separator (2500 rpm).

The yield of juice after centrifugation was 25.0 L (19° Brix; pH, 5.6; viscosity, 12.5 cps). This was subjected to a concentration of 55° Brix (2.9 L) employing an agitated thin film evaporator (vacuum 23" Hg and steam pressure 2–4 Kg/cm$^2$). The concentrate obtained was heated (80° C.) and added citric acid (0.5%) and pectin (1.2%) along with stirring. The concentrate was homogenized with a heteropolysaccharide at a concentration of 0.2% and carrageenan (0.3%) at a speed of 20000 rpm in the homogeniser (Ultra Turrax T 25 Basic, IKA, Werke, Germany) and the mixture was heated (96±2° C.). The setting point was determined using plate test and T.S.S. was kept at 73° Brix. The oleoresin ginger (0.25%) and β-carotene (10 ppm) was added at the end of processing followed by stirring. The spreadability of the product obtained was optimum. The product was poured in clean, dry glass bottles and cooled to ambient temperature and bottles were capped.

EXAMPLE 2

30 Kg Sugarcanes were cleaned with water and the outer skin scraped manually with a knife. The scraped sugarcanes were soaked in 100 L water containing 100 g KMS and 10 g citric acid for 4 hours. The canes were drained off water; washed with fresh water and then crushed to obtain 15.5 L juice [16° Brix]. The juice was centrifuged, and the clear juice [15.0 L] was concentrated using an agitated thin film evaporator to 2.0 L of 50° Brix. The concentrate was heated along with citric acid (0.5%) and pectin (1.0%). The heat processing time was kept to a minimum (10 min) at 96±2° C. to protect heat labile nutrients and delicate aroma. Setting point was determined using plate test and T.S.S. was 75° Brix. The natural flavor such as oleoresin cumin (0.25%) and β-carotene (10 ppm) were added at the end of processing with stirring. The product obtained was poured in clean, dry glass bottles and cooled to ambient temperature and capped.

What is claimed is:

1. A sugarcane juice spread comprising 85 to 95% by wt. concentrated sugarcane juice having a concentration of 45 to 60° Brix, 0.05 to 0.5% by wt Xanthan, 0.05 to 1.0% by wt Carrageenan, 1.0 to 3.0% by wt food preservative, 1.0 to 5.0% by wt. of a gelling agent, 5.0 to 30.0 ppm of a nutraceutical and optionally 0.1 to 1.5% by wt. of a flavoring agent.

2. A juice spread as claimed in claim 1, wherein said juice spread further comprises 85 to 90% by wt. concentrated sugarcane juice having a concentration of 45 to 60° Brix, 0.05 to 0.5% by wt Xanthan, 0.05 to 1.0% by wt Carrageenan, 1.0 to 3.0% by wt food preservative, 1.0 to 5.0% by wt. of a gelling agent, 5.0 to 30.0 ppm of a nutraceutical and 0.1 to 0.5% by wt. of Ginger extract and 0.1 to 0.6% by wt Cumin extract.

3. A juice spread as claimed in claim 1, wherein the food preservative is citric acid.

4. A juice spread as claimed in claim 1, wherein the gelling agent is pectin.

5. A sugarcane juice spread according to claim 1 wherein the nutraceutical is β-carotene.

6. A process for preparing a ginger and cumin flavored sugarcane juice spread, said process comprising:
   (a) soaking the canes in water containing 0.1% by wt. potassium meta bi-sulphite and 0.01% by wt. citric acid for 2–4 hrs;
   (b) washing the sugarcanes of step (a) and crushing the same to obtain sugarcane juice having a concentration of 18–20° Brix;
   (c) filtering the sugarcane juice of step (b) at 25–28° C.;
   (d) concentrating the filtered juice of step (c) to a solid content of 45–60° Brix;
   (e) adding 0.1–1.0% by wt of food preservatives to the concentrated juice of step (d);
   (f) thickening or emulsifying the concentrated juice of step (e) by adding 0.5 to 5% by wt. pectin and 0.03 to 0.5% by wt. of a heteropolysaccharide;
   (g) adding 0.03–1.0% by wt. carrageenan to the emulsified sugarcane juice of step (f);
   (h) heating the mixture of step (g) for 6–15 min to 90–98° C. to achieve setting;
   (i) adding 1–100 ppm of β-carotene to the mixture of step (h);
   (j) optionally adding ginger/cumin oleoresin at a concentration range of 0.1–0.6% by wt. followed by stirring, and
   (k) cooling the mixture of step (j) at ambient temperature to obtain the sugarcane juice spread.

7. A process as claimed in claim 6 wherein in step (b), the sugarcanes are washed with plain water before being crushed.

8. A process as claimed in claim 6 wherein in step (b), the sugarcanes are crushed using mechanical devices.

9. A process as claimed in claim 6 wherein in step (c), the sugarcane juice is filtered by centrifuging at 2000–2500 rpm.

10. A process as claimed in claim 6 wherein in step (d) the sugarcane juice is concentrated using thin film evaporator.

11. A process as claimed in claim 6, wherein the food preservative is citric acid.

12. A process as claimed in claim 6 wherein in step (f), 0.03 to 0.07% by wt of heteropolysaccharide is used.

13. A process as claimed in claim 6, wherein a natural food flavor includes ginger/cumin oleoresin in a concentration range of 0.1–0.4%.

* * * * *